United States Patent [19]
Rion

[11] Patent Number: 5,542,701
[45] Date of Patent: Aug. 6, 1996

[54] WIRE TRACK WITH INTEGRAL SEALING MECHANISM AND INFLATOR

[75] Inventor: Robert B. Rion, Redford, Mich.

[73] Assignee: AlliedSignal Inc., Morristown, N.J.

[21] Appl. No.: 411,352

[22] Filed: Mar. 22, 1995

Related U.S. Application Data

[63] Continuation of Ser. No. 236,929, May 2, 1994, abandoned, which is a continuation-in-part of Ser. No. 966,763, Oct. 26, 1992, Pat. No. 5,308,108.

[51] Int. Cl.[6] ................................................. B60R 21/32
[52] U.S. Cl. ...................... 280/735; 280/741; 280/728.2
[58] Field of Search ............................. 280/728.1, 728.2, 280/735, 737, 741

[56] References Cited

U.S. PATENT DOCUMENTS

| | | | |
|---|---|---|---|
| 3,567,245 | 3/1971 | Ekstrom | 280/737 |
| 4,153,273 | 5/1979 | Risko | 280/728 A |
| 4,944,527 | 7/1990 | Bishop et al. | 280/728 A |
| 5,031,932 | 7/1991 | Frantom et al. | 280/737 |
| 5,308,108 | 5/1994 | Rion | 280/728 A |

Primary Examiner—Kenneth R. Rice
Attorney, Agent, or Firm—Markell Seitzman

[57] ABSTRACT

A manifold (10) for holding a generally cylindrically shaped gas generator (12), the gas generator including inflation ports (84a, b) through which inflation gas exits to inflate an air bag. A wire track/seal assembly (200) is fitted between the gas generator and manifold to route and protect wires extending from the gas generator. The wire track/seal assembly is received in notches formed in ends of the gas generator and includes an integrally formed seal member.

5 Claims, 3 Drawing Sheets

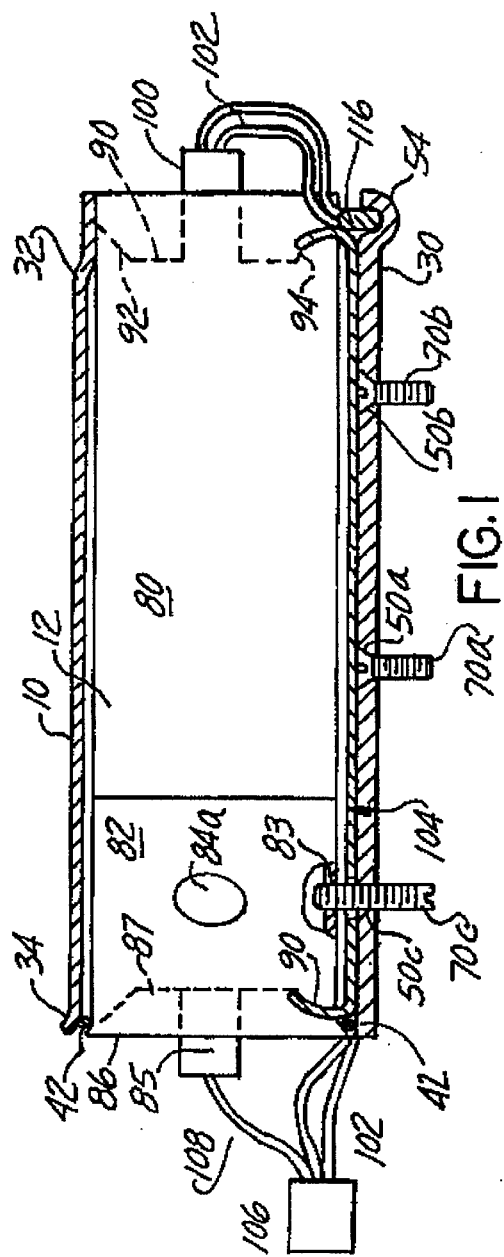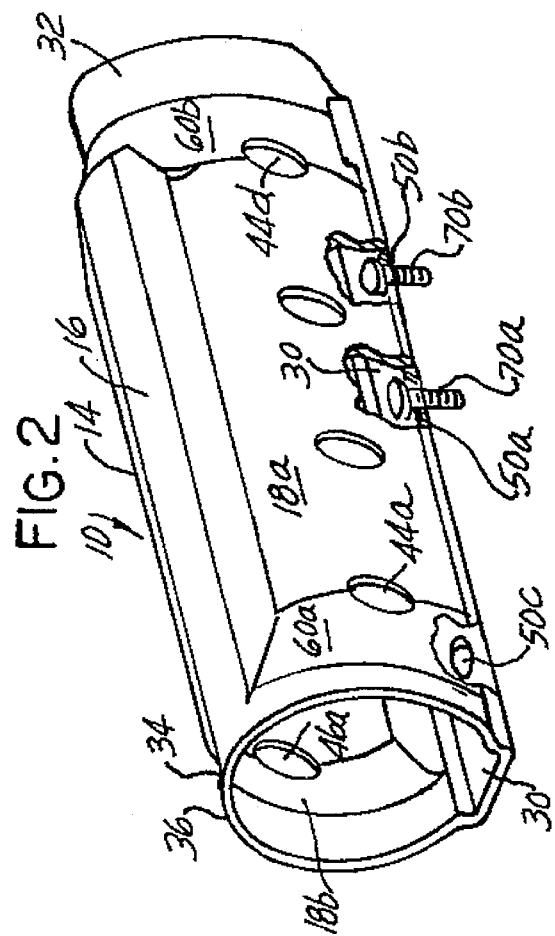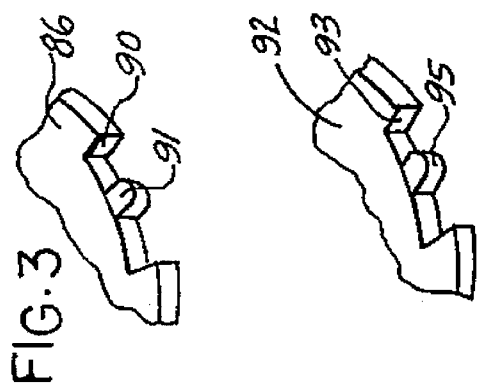

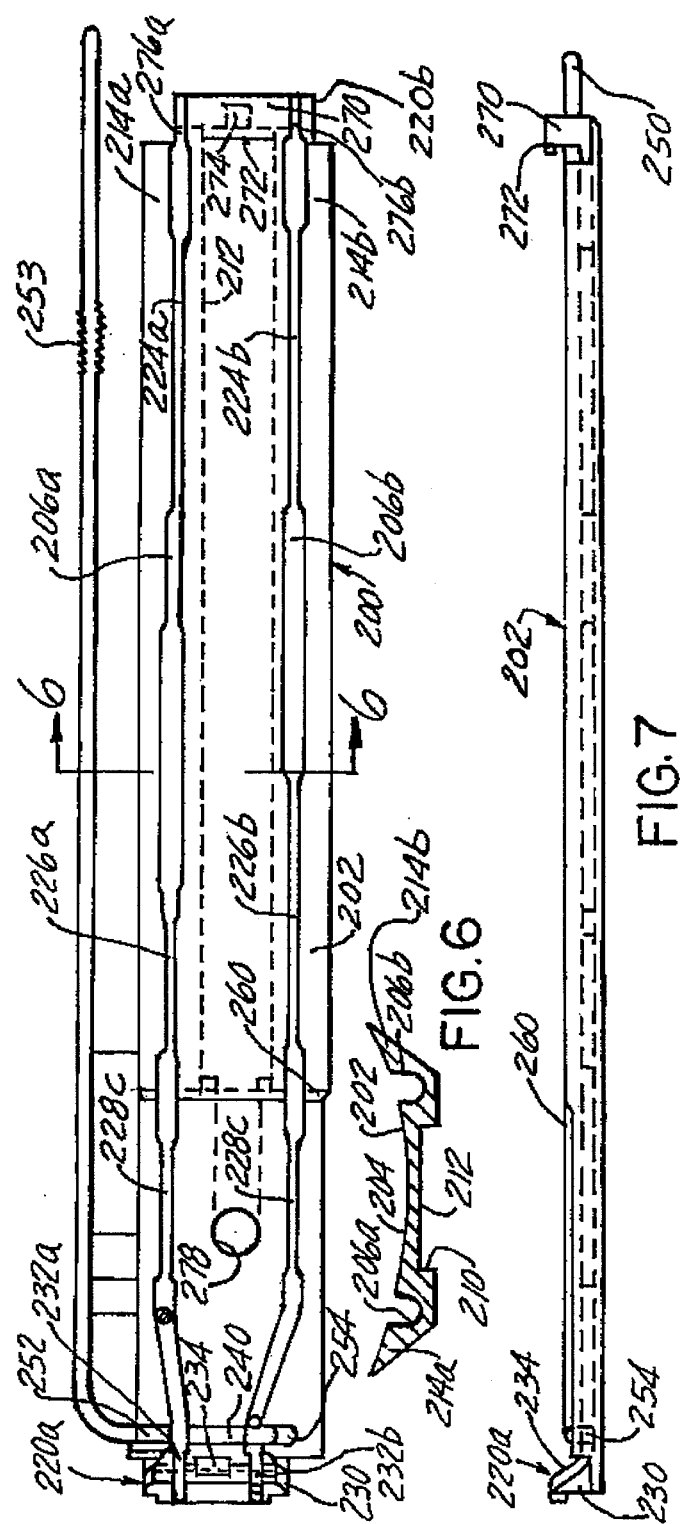

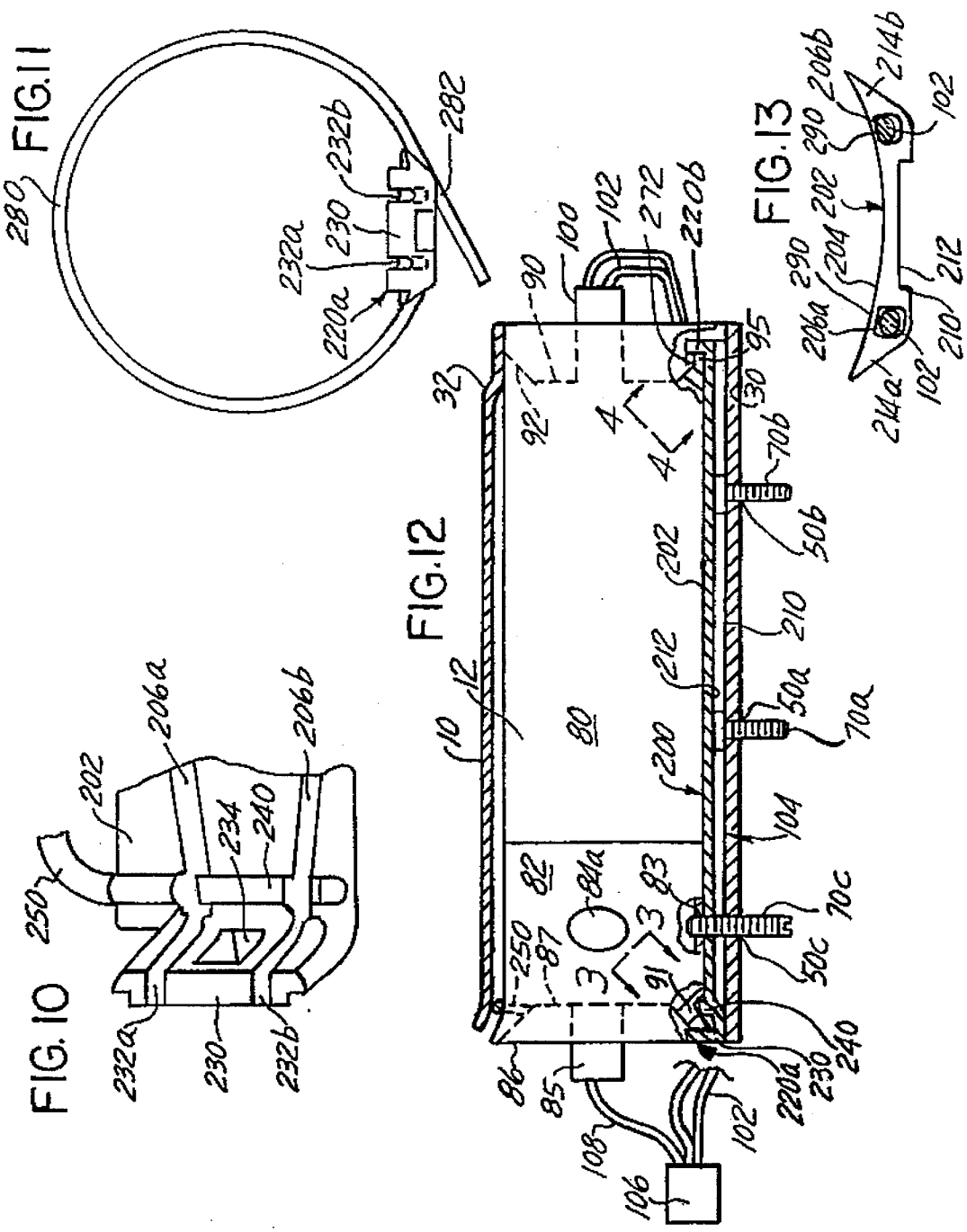

WIRE TRACK WITH INTEGRAL SEALING MECHANISM AND INFLATOR

This application is a continuation of application Ser. No. 08/236,929 filed May 2, 1994 now abandoned which is a continuation in part of application Ser. No. 07/966,763 filed Oct. 26, 1992, now U.S. Pat. No. 5,308,108.

BACKGROUND AND SUMMARY OF THE INVENTION

The present invention relates generally to a structure for supporting a gas generator for an air bag and more specifically to a plastic wire track having an integral seal.

In my patent application U.S. Ser. No. 07/966,763, filed Oct. 26, 1992, now U.S. Pat. No. 5,308,108, entitled "Manifold or Retainer For A Gas Generator", incorporated herein by reference, I provided an improvement which described a manifold for a the gas generator. In this concept, a separate seal, such as an O-ring 42 (see FIG. 1 hereof) was required to seal one end of the gas generator 12/manifold 10 combination to prevent inflation gas from exiting therefrom. An additional seal 116 was used to close a passage between a wire track 104 and a space between the gas generator/manifold. The present invention finds application as a part of an air bag safety restraint system and more specifically for a system that uses a cylindrically shaped gas generator. One such inflator is illustrated in U.S. Pat. No. 5,062,664 which is incorporated herein by reference.

It is an object of the present invention to provide a gas generator/manifold combination and more particularly an improved a wire track assembly that permits the easy integration of a gas generator into a manifold while providing improved sealing.

Accordingly, the invention comprises: an apparatus comprising: a cylindrically shaped gas generator, a manifold for holding the gas generator, and a wire track/seal assembly for protecting wires emanating from one side of the gas generator and for feeding or routing such wires to the other side of the gas generator. The gas generator including inflation ports through which inflation gas exits to inflate an air bag and a first and second notch in ends or lips. The manifold comprising: a one piece hollow extruded structure comprising: a cylindrical middle portion and first and second ends, the middle portion having a diameter section slightly larger than the diameter of the gas generator, the first end being narrowed to provide an interference fit with a mating portion of the gas generator upon insertion of the gas generator. The middle portion further comprising two oppositely positioned outwardly flared portions the flared portions in cooperation with walls of the gas generator, defining gas receiving portions to receive inflation gas from the gas generator, the flared portions each including at least an exit port to direct inflation gas out of the manifold; the structure additionally includes on a lower portion thereof, an axially directly outwardly extending protrusion into which is received the wire track/seal assembly. The assembly including a wire track and a flexible rod shaped member of integral construction that is bendable generally into a circle to form a seal between the gas generator and the manifold, the wire track having ends fitted to the notches of the gas generator and means for receiving and holding the wires extending from the gas generator.

BRIEF DESCRIPTION OF THE DRAWINGS

In the drawings:

FIG. 1 shows a part of my earlier invention.

FIG. 2 shows a manifold usable with the present invention.

FIGS. 3 and 4 show isolated views of ends of a gas generator.

FIG. 5 shows a wire track/seal assembly

FIG. 6 is a cross-sectional view of the wire track/seal assembly.

FIG. 7 is a side view of the track seal assembly.

FIGS. 8 and 9 shown isolated views of ends of the track/seal assembly.

FIG. 10 in an enlarged projected view of one end of the wire track assembly.

FIG. 11 shows an isolated view of a track/seal assembly.

FIG. 12 shows the track/seal assembly mounted to a gas generator.

FIG. 13 shows an alternate view of the invention.

Many other objects and purposes of the invention will be clear from the following detailed description of the drawings.

DETAILED DESCRIPTION OF THE DRAWINGS

FIG. 2 shows a manifold 10 that is usable with the present invention and is substantially identical to that shown in my earlier invention. The manifold is generally a hollow cylindrical structure fabricated of aluminum alloy such as 6063T6 that is extruded into a cylindrical shape having a cylindrical middle portion 16 and plurality of opposingly positioned outwardly flared side portions 18a, and 18b. When the manifold is first formed, it additionally includes an axially directed, outwardly extending projection 30 into which is inserted a wire track assembly 200 of the present invention. The extruded manifold 10 is thereafter formed into the shape shown in FIG. 2. More specifically, the fight hand end 32 is formed by known metal forming techniques with a generally circular cross-sectional profile, so that it can provide an interference fit with a corresponding cylindrically shaped end of the gas generator. In my prior invention the gas generator included a notch forming a hole or opening relative to the manifold and wire track. This opening was sealed by a resilient seal such as 116 as shown in FIG. 1. This seal is eliminated in the present invention. The left or opposite end 34 of the manifold 10 is formed with an outwardly extending conically flared portion or lip 36.

A plurality of openings 44a–d are formed in one of the flared side portions such as 18a and a second set of openings 46a–46d are formed in the oppositely positioned side portion 18b. Only opening 46a can be seen in FIG. 2. In addition, a plurality of openings 50a–50c are also provided in the protrusion 30 as shown in FIG. 2. The ends such as 60a and 60b of each side portion 18a and 18b are bent downwardly to give these side portions the truncated or somewhat trapezoidal shape as shown in FIG. 2. In the present invention as well as with my earlier invention the walls 92 of the gas generator 12 form, in concert with the outwardly extending portions 18a and 18b, a plurality of cavities or chambers or chambers for receiving and for distributing inflation gas received at one end of these cavities uniformly therethrough to an associated air bag. A plurality of fasteners such as 70a and 70b, see FIG. 2, are press fit within the corresponding openings 50a and 50b. A third fastener 70c is threaded within opening 50c. After the installation of the gas generator 12 within the manifold 10, the fastener 70c enters hole 83 or alternatively engages a recess or butts against a wall of the gas generator to provide a means for axially locking the gas generator 12 to the manifold. As can be appreciated, the fastener 70c engages a non-pressure vessel portion, i.e., activation portion 82 of the gas generator. These fasteners provide a means for attaching the manifold 10 and gas generator 12 to a cooperating structure such as a reaction can 100 (shown in phantom line in FIG. 7 of my earlier invention) or directly to a mating portion of the vehicle structure (not shown) so that the gas generator as well as the air bag attached thereabout is correctly positioned relative to a deployment door to permit the proper deployment of the air bag. Prior to installation of the gas generator 12 to the manifold 10, the air bag 80 in a folded configuration is placed about the manifold 12.

The gas generator 12 used in the present invention is substantially identical to used in my earlier invention. This gas generator 12 is a hybrid gas generator or inflator. Characteristic of hybrid gas generators is that they include a pressure vessel portion 80 typically used to store a quantity of pressurized Argon inflation gas and an activation portion 82 adjacent to the pressure vessel portion. Typically, the activation portion 82 includes a squib 85 and a small quantity of propellant that is used to open a passage typically closed by a rupture disk leading from the pressure vessel portion 80. Upon opening the disk, the Argon gas exits from the at least two oppositely positioned exits (only exit 84a is shown). The purpose of the propellant is to provide additional heat energy to heat the stored Argon gas to improve the efficiency of inflation. The activation portion 82 also includes a threaded hole 83 to receive a fastener as described below. Fastener 70c is used for the same purpose herein. To maintain the gas generator in a thrust neutral condition (a condition in which the resultant force vector, imparted by the exiting inflation gas, to the inflator is zero) the gas exits 84a, b are angled upwardly about 8 degrees from the horizontal to compensate for any gas that might flow through hole 83 prior to being closed by its fastener and being installed within the manifold. The inflator 12 is formed with a flared lip 86 in a cup-shaped end 87 of the activation portion 82. In my above-mentioned invention, an O-ring 42 was disposed about the gas generator so that when it was inserted within the manifold 10 the O-ring provided a tight, rattle-free seal between the flared wall 86 and the flared portion 34 of the manifold.

Typically hybrid gas generators may also include a low pressure switch 100 positioned in the end cup shape 90 of the gas generator 12. The low pressure switch includes a plurality of electrical wires 102 that must be protected. The ends of these wires are combined with other wires 108 from the squib 85 at a single wire harness 106. As mentioned, in my earlier invention, the gas generator included a notch in its cylindrical end needed to receive an end of the wire track. An additional seal 116 was needed to seal this opening between generator and the track/manifold. No additional sealing was needed for the remaining surface of the cylindrical end since the cylindrical end 92 of the gas generator 12 is sized to provide an interference fit within the narrowed, circular end 32 of the manifold 10. In the present invention, the wire track 104, O-ring 42 and resilient material 116 are eliminated in view of the improvements presented below.

In the present invention, and as shown in the isolated view of FIG. 3, the conical lip or wall 86, in the generator portion 82, includes the notch 90, in its lower or bottom portion. The notch additionally includes a projection or boss 91. FIG. 4 shows an isolated view of the cylindrically shaped wall 92 which includes a second notch 93 having a projection or boss 95. As shown below these notches and bosses permit attachment of the wire track assembly 200 of the present invention.

Reference is made to the wire track/seal assembly 200 shown in FIG. 5. This assembly may be manufactured of a low cost, flexible plastic such as, a low elongation thermoplastic such as polypropylene. The assembly 200 includes a wire track 202 and a flexible rod shaped member 250. The wire track 202 includes an arcuately shaped top surface 204 conformally shaped with the outer, generally circularly shaped wall of the gas generator 12. The track 200, in its top 204, includes a plurality of grooves 206a and 206b for receiving the plurality of sensor wires 102. The track 202 includes a bottom 210 which includes a central groove 212 therein. The bottom is received within the protrusion of the manifold 30 such that the groove 212 passes over the heads of the fasteners 70a and 70b. Positioned outside the groove 206a and 206b are side walls 214a and 214b. As can be seen from FIG. 5, the assembly 200 includes two integrally formed end pieces 220a and 220b. These end pieces are pressed within the notches 90' and 93 in the ends 86 and 92 of the hybrid generator. The end pieces effectively close or seal these notches 90' and 93 to prevent inadvertent escape of inflation gas. Portions 224a, b and 226a, b and 228a,b of the grooves 206a and 206b are narrowed to provide an interference fit with the wires to hold them in place. End piece 220a includes an upstanding end 230 having a plurality of narrow grooves 232a and 232b to also provide a press fit for the wires therein. Formed in the end piece 230 is a cut-out or notch 234 which touches boss 91 when the assembly is in place on the gas generator. Positioned in front of the end piece 220a is an upstanding boss 240. When the wire track is in position on the bottom of the gas generator, this boss 240 lightly touches the outer bottom well of the gas generator providing a seal. As will be seen this boss 240 is essentially a continuation of the member 250. Integrally formed on one side end of the track/seal assembly 200 is the flexible, plastic rod shaped member 250 which as described below will replace the O-ring 42 shown in my earlier invention. In FIG. 5, the plastic member 250 is shown extending parallel to the track 200. This is the configuration that the wire track 202 and member 250 take when injection molded. Thereafter the flexible 250 is moved or bent into its deserved orientation.

Positioned oppositely from the base 252 of the flexible member 250 is a slot or groove or opening 254 having a dimension slightly greater of the diameter of the flexible member to permit the flexible member to be inserted therein. The member 250 may also include a plurality of bards 253 to provide for a locking engagement with the sides of the opening 254. The side profile of the track is shown in FIG. 7 and may include a stepped down portion 260 which merely lowers the height of the corresponding side walls 214a and 214b to permit the wire track assembly 200 to accommodate a non-uniform cross sectional of the gas generator. Often the generator portion 82 has a slightly larger diameter than the pressure vessel portion 80 and the stepped down or notched portion 260 permits the wire track to lie closer against the outer wall of the gas generator. The end portion 220b of the gas generator includes an end wall 270, having a cap portion 272. A vertically extending groove 274 is formed within the end 270. As will be seen from the description below, the boss 95 of the end 92 of the gas generator fits within the groove 272. The end piece 220b further includes extensions of the wire grooves generally shown as 276a and 276b which have a narrowed diameter to permit the press fitting of the wires therein. FIGS. 8 and 9 illustrate partial cross-sectional views of the end portions 220a and 220b respectively. FIG. 10 shows a projected view of end piece 220a.

Prior to insertion of the gas generator 12 into the manifold 10, the flexible member 250 is formed into an over sized loop 280, greater than the diameter of the gas generator 12, shown in FIG. 11 with the flexible member 250 fitted through the opening 254. Thereafter, the gas generator is inserted within the oversized loop 280. The end 220*b* is inserted within the notch 93 in the end 92 of the gas generator with the boss 95 press fit within the notch 272 formed in the end 270. The wire track is laid generally flat against the bottom of the gas generator and the end piece 220*a* is fit within the notch 90' of the end 86 of the gas generator. The boss 91 formed within the notch 90' of the gas generator is press fit against an inner wall of the notch 232 formed in end piece 220*a*. Thereafter, the flexible member 250 is pulled taught about the gas generator and the excess cut off generally at the location shown by numeral 282. If the member includes the barbs 253 the barbs engage the wall of the opening 254 holding the member in place. As can be seen from FIG. 12, the flexible member 250 is fitted about the gas generator at approximately the base of its flared, conical portion or wall 86. Thereafter, the gas generator 12 and wire track assembly 200 are slid within the manifold 10. The protrusion 30 of the manifold functions to properly locate the gas generator 12 within the manifold 10. The track 202 includes an opening 278 which is located just below opening 83 in the gas generator. The fastener 70*c* which extends from the manifold 10 passes through the opening 278 and extends into opening 83 to hold the generator in place.

In the embodiment described above, the wire track assembly is fabricated first and thereafter the wires inserted within the grooves. In the alternate embodiment the track assembly 200 is injected molded about the wires 102. FIG. 13 shows that a portion 290 of the top 204 of the assembly 200 encapsulates the wires 102. As can be appreciated the wires 102 can pre-cut to the desire length and may include the electric terminals used to connect with the sensor 100 and connector 106. The wires are then inserted within an injection molding machine with the track/seal assembly 200 molded thereabout. The benefit of this type of construction eliminates two loose pieces such as the two wires 102. As can be appreciated the narrowed portions of the grooves 224, 226 and 228 which were used to hold the wires 102 in the tracks 206 can be eliminated.

Many changes and modifications in the above described embodiment of the invention can, of course, be carried out without departing from the scope thereof. Accordingly, that scope is intended to be limited only by the scope of the appended claims.

I claim:

1. An apparatus comprising:

a cylindrically shaped gas generator (12), a manifold (10) for holding the gas generator (12), and a wire track/seal assembly (200) for protecting wires emanating from one side of the gas generator and for feeding such wires to the other side of the gas generator, the gas generator including inflation ports (84*a, b*) through which inflation gas exits to inflate an air bag and a first and second notch (90, 93) in ends or lips (86, 92);

the manifold comprising: a one piece hollow extruded structure comprising:

a cylindrical middle portion (16) and first (32) and second (34) ends, the middle portion having a diameter section slightly larger than the diameter of the gas generator, the first end being narrowed to provide an interference fit with a mating portion of the gas generator upon insertion of the gas generator;

the middle portion further comprising two oppositely positioned outwardly flared portions (18*a, b*), the flared portions in cooperation with walls of the gas generator, defining gas receiving portions (22*a, b*) to receive inflation gas from the gas generator, the flared portions each including at least an exit port (44*a–d*, 46*a–d*) to direct inflation gas out of the manifold; the structure additionally includes on a lower portion thereof, an axially directly outwardly extending protrusion (30) into which is received the wire track/seal assembly (200), the assembly (200) including a wire track (202) and a flexible rod shaped member (250) of integral construction that is bendable generally into a circle to provide a seal between the gas generator and the manifold, the wire track (202) having end pieces (220*a, b*) fitted to the notches of the gas generator and means for receiving and holding wires (102) extending from the gas generator.

2. An assembly comprising:

a cylindrically shaped gas generator (12), including inflation ports through which inflation gas exits to inflate an air bag the assembly (200), a cylindrically shaped manifold (10) for receiving therein and for holding the gas generator (12), and a wire track/seal assembly (200) for protecting wires (102) emanating from one side of the gas generator, the wire track/seal assembly including a protective track portion for supporting and protecting the wires and a flexible rod shaped member (250) of integral construction that is bendable generally into a circle fitted between the gas generator and manifold to provide a seal between the gas generator and the manifold.

3. The device as defined in claim 2 wherein the gas generator includes a first and a second notch (90,93) in ends or lips (86,92) thereof and wherein the wire track (202) includes end pieces (220*a,b*) fitted to the notches.

4. The device as defined in claim 2 wherein the enclosed track portion is molded about the wires.

5. The device as defined in claim 2 wherein the track portion includes at least one groove into which a wire is placed.

* * * * *